US010294127B2

(12) United States Patent
Tokunaga et al.

(10) Patent No.: US 10,294,127 B2
(45) Date of Patent: May 21, 2019

(54) METHOD OF OPERATING REVERSE OSMOSIS MEMBRANE APPARATUS

(71) Applicant: MITSUBISHI HEAVY INDUSTRIES, LTD., Tokyo (JP)

(72) Inventors: Kiichi Tokunaga, Tokyo (JP); Takeshi Yasunaga, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 623 days.

(21) Appl. No.: 14/768,548

(22) PCT Filed: Feb. 10, 2014

(86) PCT No.: PCT/JP2014/053009
§ 371 (c)(1),
(2) Date: Aug. 18, 2015

(87) PCT Pub. No.: WO2014/129341
PCT Pub. Date: Aug. 28, 2014

(65) Prior Publication Data

US 2016/0002071 A1 Jan. 7, 2016

(30) Foreign Application Priority Data

Feb. 20, 2013 (JP) ................................ 2013-030682

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 61/12* (2013.01);
(Continued)

(58) Field of Classification Search
CPC ............ B01D 2311/25; B01D 2311/16; B01D 2311/06; B01D 2311/146; B01D 2311/10;
(Continued)

(56) References Cited

U.S. PATENT DOCUMENTS 4,341,629 A * 7/1982 Uhlinger .............. B01D 61/022 210/128
6,190,556 B1 * 2/2001 Uhlinger .............. B01D 61/022 210/636
(Continued)

FOREIGN PATENT DOCUMENTS

DE 19748997 A1 5/1999
DE 19818692 C1 7/1999
(Continued)

OTHER PUBLICATIONS

English language machine translation of DE 19818692 C1, Accessed Dec. 21, 2017, pp. 1-8. (Year: 1999).*
(Continued)

*Primary Examiner* — David C Mellon
(74) *Attorney, Agent, or Firm* — Westerman, Hattori, Daniels & Adrian, LLP

(57) ABSTRACT

To enable energy-saving operation and stable supply of permeate water while water quality level of the permeate water is satisfied during operation, clarified seawater sw subjected to pretreatment and stored in to-be-treated water tank 12 is supplied to reverse osmosis membrane module 14 via clarified seawater supply passage 16. Permeate water pw obtained by an earlier stage element of the reverse osmosis membrane elements 36 of the reverse osmosis membrane module 14 is sent to a subsequent process from permeate water sending passage 46, and permeate water pw obtained by the reverse osmosis membrane element 36 is circulated into the to-be-treated water tank 12 via permeate water circulation passage 48. The flow rate of the clarified seawa-
(Continued)

ter sw supplied to the reverse osmosis membrane module 14 is controlled by variable flow rate high-pressure pump 22 provided in the clarified seawater supply passage 16, and opening degree of flow regulating valve 68 provided in the permeate water circulation passage 48 is controlled, whereby the circulation flow rate of the permeate water is controlled.

8 Claims, 5 Drawing Sheets

(51) Int. Cl.
*B01D 61/12* (2006.01)
*C02F 103/08* (2006.01)

(52) U.S. Cl.
CPC ...... *B01D 2311/10* (2013.01); *B01D 2311/16* (2013.01); *B01D 2311/246* (2013.01); *B01D 2313/243* (2013.01); *C02F 2103/08* (2013.01); *Y02A 20/131* (2018.01)

(58) Field of Classification Search
CPC .......... B01D 2311/24; B01D 2311/243; B01D 61/025; B01D 61/12; B01D 2313/243; B01D 2311/246; C02F 1/44; C02F 1/441; C02F 2103/08; Y02A 20/131
See application file for complete search history.

(56) References Cited

U.S. PATENT DOCUMENTS

| | | | | |
|---|---|---|---|---|
| 2007/0295650 | A1* | 12/2007 | Yoneda | B01D 61/025 210/97 |
| 2008/0308475 | A1 | 12/2008 | Ito et al. | |
| 2011/0290723 | A1* | 12/2011 | Bonnelye | B01D 61/12 210/636 |
| 2011/0309007 | A1 | 12/2011 | Ito et al. | |
| 2012/0152721 | A1 | 6/2012 | Gaid et al. | |
| 2014/0262989 | A1* | 9/2014 | Pimentel | B01D 61/12 210/96.2 |
| 2015/0053596 | A1* | 2/2015 | Kageyama | C02F 1/008 210/104 |

FOREIGN PATENT DOCUMENTS

| | | | |
|---|---|---|---|
| EP | 2394964 | A1 | 12/2011 |
| JP | 4-145928 | A | 5/1992 |
| JP | 2001-300264 | A | 10/2001 |
| JP | 2008-307487 | A | 12/2008 |
| JP | 2009-279472 | A | 12/2009 |
| JP | 2010-179264 | A | 8/2010 |
| WO | 2010/139773 | A1 | 12/2010 |

OTHER PUBLICATIONS

Decision to Grant a Patent dated Nov. 11, 2016, issued in counterpart Japanese Application No. 2013-030682, with English translation. (6 pages).
Extended (Supplementary) European Search Report (EESR) dated Sep. 16, 2016, issued in counterpart European Patent Application No. 14754337.5. (7 pages).
International Search Report dated Apr. 15, 2014, issued in counterpart application No. PCT/JP2014/053009 (2 pages).
Notification of Transmittal of Translation of the International Preliminary Report on Patentability dated Sep. 3, 2015, issued in counterpart International Application No. PCT/JP2014/053009 (12 pages).
Office Action dated Sep. 24, 2018, issued in counterpart European Application No. 14754337.5 (4 pages).

* cited by examiner

METHOD OF OPERATING REVERSE OSMOSIS MEMBRANE APPARATUS

TECHNICAL FIELD

The present invention relates to a method of operating a reverse osmosis membrane apparatus to be applied to e.g. seawater desalination plants or pure water production apparatuses, which enables stable supply of manufactured water with good quality, energy-saving operation and prolonged life of membranes.

BACKGROUND

For production of fresh water from seawater or for production of clean water from river or lake water, reverse osmosis membrane apparatuses having a reverse osmosis membrane module, for example, are used. By using a reverse osmosis membrane apparatus, a to-be-treated water (clarified water) produced by subjecting e.g. sea, river or lake water as raw water to pretreatment such as sterilization treatment of adding a fungicide into the sea, river or lake water or a treatment of removing impurities by using e.g. a sand filter, is pressurized to have a pressure of about 6.0 MPa by a high pressure pump, for example, and is supplied to a reverse osmosis membrane module, and the to-be-treated water is separated by using a reverse osmosis membrane provided in the reverse osmosis membrane module to obtain permeate water to be production water.

A reverse osmosis membrane module is composed of a high pressure vessel and a plurality of reverse osmosis membrane elements arranged in series in the high pressure vessel. Patent Documents 1 and 2 disclose spiral-type reverse osmosis membrane elements. A spiral-type reverse osmosis membrane element has a cylinder shape and has a structure where a sac-like reverse osmosis membrane having a flow path material therein is spirally wound via a mesh spacer around a center pipe in which permeate water is collected, and a brine seas is provided at an end of the outer peripheral surface. With the reverse osmosis membrane module, to-be-treated water is separated with reverse osmosis membrane elements sequentially from one of the first stage into permeate water and concentrated water containing saline matters and impurities to obtain permeate water by each of the reverse osmosis membrane elements, and the concentrated water separated from the permeate water is further separated into permeate water and concentrated water by the reverse osmosis membrane element of a later stage. Therefore, the salinity and concentration of impurities of concentrated water are higher at relatively downstream side.

FIG. 6 shows an example of a construction of a reverse osmosis membrane module having a high pressure vessel and spiral-type reverse osmosis membrane elements arranged in series therein, which is disclosed in Patent Document 1. In FIG. 6, the reverse osmosis membrane module 100 comprises a high pressure vessel 102 and four to eight reverse osmosis membrane elements 104 arranged in series in the high pressure vessel 102. To-be-treated water tw is supplied at a high pressure to an inlet opening 102*a* of the high pressure vessel 102 by a high pressure pump (not shown) provided in a to-be-treated water supply passage 114. The to-be-treated water enters into the reverse osmosis membrane element of the first stage from the inlet, and it is separated into permeate water pw and concentrated water cw in the reverse osmosis membrane element 104.

The permeate water pw is flown into the center pipe 106, and the concentrated water cw is flown out from the outlet of the reverse osmosis membrane element 104. In the reverse osmosis membrane element 104 of the first stage, the inlet of the center pipe 106 is obstructed with an end cap 108. The center pipe 106 of each of the reverse osmosis membrane elements 104 is connected with a connector 110. Accordingly, the permeate water pw from each of the reverse osmosis membrane elements 104 joins together and is discharged from an outlet opening 102*b* of the high pressure vessel 102 to a permeate water discharging passage 116.

As the interior of the high pressure vessel 102 is partitioned with brine seals 112 provided on outer peripheral surface of each of the reverse osmosis membrane elements 104, the concentrated water cw flown out of each of the reverse osmosis membrane elements 104 is flown into the reverse osmosis membrane element of a later stage as to-be-treated water without going past the reverse osmosis membrane element of the later stage. The concentrated water cw is thereby permeated sequentially with the reverse osmosis membrane elements. The concentrated water cw discharged from the reverse osmosis membrane element 104 in the last stage is discharged from an outlet opening 102*c* formed at the outlet end of the high pressure vessel 102 to a concentrated water discharging passage 118.

In general, in reverse osmosis membrane apparatuses applied to seawater desalination plants, in case of change in temperature of seawater or change in water quality, the amount of the permeate water is controlled via a control valve provided in the to-be-treated water supply passage at the outlet side of the high pressure pump or via rotation speed of the high pressure pump. The control valve needs to be manufactured from a seawater-resistant material such as super duplex stainless steel and needs to have resistance against high pressure, and thus it is required to have a large thickness, which may result in high cost.

The water quality of the permeate water may be declined along with aging deterioration of the reverse osmosis membranes or increase in the seawater temperature, thereby not to satisfy a target value. In addition, the water quality of the permeate water varies depending upon the water quality of the raw seawater which is source of the clarified seawater subjected to pretreatment. In order to obtain a targeted water quality, it is effective to change the recovery rate (amount of permeate water/supply amount of clarified seawater) of the reverse osmosis membrane. However, in this case, the amount of permeate water may change, and the permeate water may not be supplied stably. As a method for increasing the amount of the permeate water, there is a method of increasing the supply pressure of the clarified seawater supplied to the reverse osmosis membrane element. However, as the pressure capacities of the reverse osmosis membranes and the high pressure vessel have limitations, water quality improvement by increasing the supply pressure is limited.

Patent Documents 1 and 2 disclose, as a measure for improving water quality of the permeate water, a method of returning a part of the permeate water to the to-be-treated water, mixing the returned permeate water with the clarified seawater, and supplying the returned permeate water again with the clarified water to the reverse osmosis membrane module. That is, in a plurality of reverse osmosis membrane elements arrange in series, as the to-be-treated water is passed through the reverse osmosis membrane elements sequentially from ones of an earlier stage to ones of a later stage, the concentration of the concentrated water becomes higher as the stage of the reverse osmosis membrane element is later. Accordingly, the water quality of the permeate water separated by the reverse osmosis membrane element of a later stage is worth than that of the permeate water separated by the reverse osmosis membrane element of an earlier stage. Therefore, in order to improve the water quality, the permeate water passed through the reverse osmosis membrane element of the later stage is returned to the to-be-treated water to reduce the salinity of the to-be-treated water to be supplied to the reverse osmosis membrane elements, or a permeate water from the reverse osmosis membrane element of the earlier stage, which has a relatively good water quality, is obtained.

CITATION LIST

Patent Literature

Patent Document 1: JP Hei04-145928 A (FIG. 7)
Patent Document 2: JP 2001-300264 A

SUMMARY

Technical Problem

As described above, in reverse osmosis membrane apparatuses applied to seawater desalination process, the water quality of the permeate water may change depending upon e.g. the aging deterioration of the reverse osmosis membranes, or the temperature or the salinity of the seawater. For example, in some cases, when the reverse osmosis membrane is not deteriorated, the quality of the permeate water may excessively satisfy the required value, and in such a case, power for the pump, for example, may be wasteful. On the other hand, in a case where the reverse osmosis membrane is deteriorated, the water quality of the permeate water may not satisfy the required value. Such excessive or deficient satisfaction of the water quality may occur due to the change in temperature of the seawater.

Under some change factors as described above, in seawater desalination plants, it is necessary to satisfy the required value of the water quality of the permeate water, to supply the permeate water in a stable amount, and to realize energy-saving operation. Patent Documents 1 and 2 only discloses just an idea of a method of circulating a part of permeate water as a means for improving water quality of the permeate water, which does not satisfy the above necessity.

In view of the above problems, an object of the present invention is to enable energy-saving operation and stable supply of permeate water, satisfying the water quality level the permeate water during operation, under the above change factors.

Solution to Problem

In order to achieve the object, the method of operating a reverse osmosis membrane apparatus according to the present invention, which may be applied to a reverse osmosis membrane apparatus employing a reverse osmosis membrane module having a plurality of reverse osmosis membrane elements arranged in series inside a high pressure vessel, and being configured to separate to-be-treated water obtained by pretreatment of raw water into concentrated water and permeate water with the reverse osmosis membrane elements sequentially from a first stage element of the reverse osmosis membrane elements, to mix the permeate water separated by a later stage element of the reverse osmosis membrane elements with the to-be-treated water, and to circulate the mixture to the first stage element of the reverse osmosis membrane elements, comprises the following steps.

That is, the method comprises:

a membrane separation step of supplying the reverse osmosis membrane module with the to-be-treated water subjected to pretreatment and stored in a to-be-treated water tank, and separating the to-be-treated water into the concentrated water and the permeate water with the reverse osmosis membrane elements sequentially from the first stage element of the reverse osmosis membrane element;

a permeate water sending step of sending the permeate water separated with an earlier stage element of the reverse osmosis membrane elements to a subsequent process, a permeate water circulation step of circulating at least a part of the permeate water separated with the later stage element of the reverse osmosis membrane elements to the to-be-treated water tank;

a circulation flow rate control step of controlling a circulation flow rate of the permeate water in the permeate water circulation step depending upon a temperature or salinity of the to-be-treated water or a deterioration degree of the reverse osmosis membrane elements to maintain a water quality of the permeate water to be sent to the subsequent process in the permeate water sending step at a required level; and a permeate water flow rate control step of controlling a flow rate of the to-be-treated water supplied to the reverse osmosis membrane module when a flow rate of the permeate water obtained by the earlier stage element of the reverse osmosis membrane elements is changed by the control of the circulation flow rate of the permeate water, to maintain the flow rate of the permeate water obtained by the earlier stage element of the reverse osmosis membrane elements at a target value.

According to the present invention, by controlling the flow rate of the permeate water flowing in a permeate water circulating passage and the flow rate of the to-be-treated water flowing into the high pressure vessel, the required value of salinity of the permeate water to be sent to the subsequent process is satisfied, and the production amount of the permeate water is maintained at a constant level, and a stable supply of the permeate water is thereby possible. In addition, the required value of the water quality of the permeate water is less likely to be excessively satisfied, and energy-saving operation is thereby possible. Such control may be manually carried out by an operator, or it may be automated by using a controller.

As described above, the temperature of the to-be-treated water, the salinity of the to-be-treated water and the deterioration degree of the reverse osmosis membrane are three of the influencing factors on the water quality of the permeate water. In the method according to the present invention, when the temperature of the to-be-treated water is increased, for example, the circulation flow rate of the permeate water is increased, and the flow rate of the to-be-treated water supplied to the reverse osmosis membrane module is increased. When the temperature of the to-be-treated water is decreased, the circulation flow rate of the permeate water is decreased, and the flow rate of the to-be-treated water supplied to the reverse osmosis membrane module is decreased.

When the salinity of the to-be-treated water is increased, the circulation flow rate of the permeate water is increased, and the flow rate of the to-be-treated water supplied to the reverse osmosis membrane module is increased. When the salinity of the to-be-treated water is decreased, the circulation flow rate of the permeate water is decreased, and the flow rate of the to-be-treated water supplied to the reverse osmosis membrane module is decreased. When the reverse osmosis membrane of the reverse osmosis membrane elements is deteriorated, the circulation flow rate of the permeate water is increased, and the flow rate of the to-be-treated water supplied to the reverse osmosis membrane module is increased. By such operation, it is possible to maintain the water quality of the permeate water at a required level and to supply the permeate water stably.

Since a part of the permeate water is returned to the to-be-treated water tank, there is no need to consider the pressure balance between the flow passage for returning the permeate water and the flow passage for receiving the permeate water. Thus, a device to adjust pressure therebetween becomes unnecessary, and it is thereby possible to reduce cost and to permit change in flow rate of the permeate water to be returned.

According to an embodiment of the present invention, a power recovery device for pressure exchanging may be provided in the discharging passage of the concentrated water discharged from a last stage element of the reverse osmosis membrane elements to increase the pressure of a part of the to-be-treated water with a high-pressure concentrated water discharged from the last stage element of the reverse osmosis membrane elements and to permit the split flow of the to-be-treated water to flow into the high pressure vessel with a booster pump. By using such a power recovery device utilizing dynamic pressure of the concentrated water, it is possible to increase the pressure of the to-be-treated water to be supplied to the reverse osmosis membrane element. It is thereby possible to reduce power needed for the reverse osmosis membrane apparatus and to realize energy-saving operation.

According to an embodiment of the present invention, a pump having an inverter device capable of controlling a rotational speed of the pump may be provided in a to-be-treatment water supply passage through which the to-be-treated water is supplied to the reverse osmosis membrane module from the to-be-treated water tank, and in the permeate water flow rate control step, the rotational speed of the high-pressure pump may be controlled to control the flow rate of the to-be-treated water flowing into the reverse osmosis membrane module. Or, the flow rate of the to-be-treated water may be controlled by a flow regulating valve provided in the to-be-treated water supply passage. Such a controlling device employing a flow regulating valve may reduce the facility cost.

Advantageous Effects

According to the present invention, a required value of the quality of the permeate water can be obtained, and the required value is not excessively satisfied, whereby energy-saving operation and stable supply of the permeate water become possible. According to the present invention, it is possible to reduce cost of a facility for returning a part of the permeate water to the to-be-treated water.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
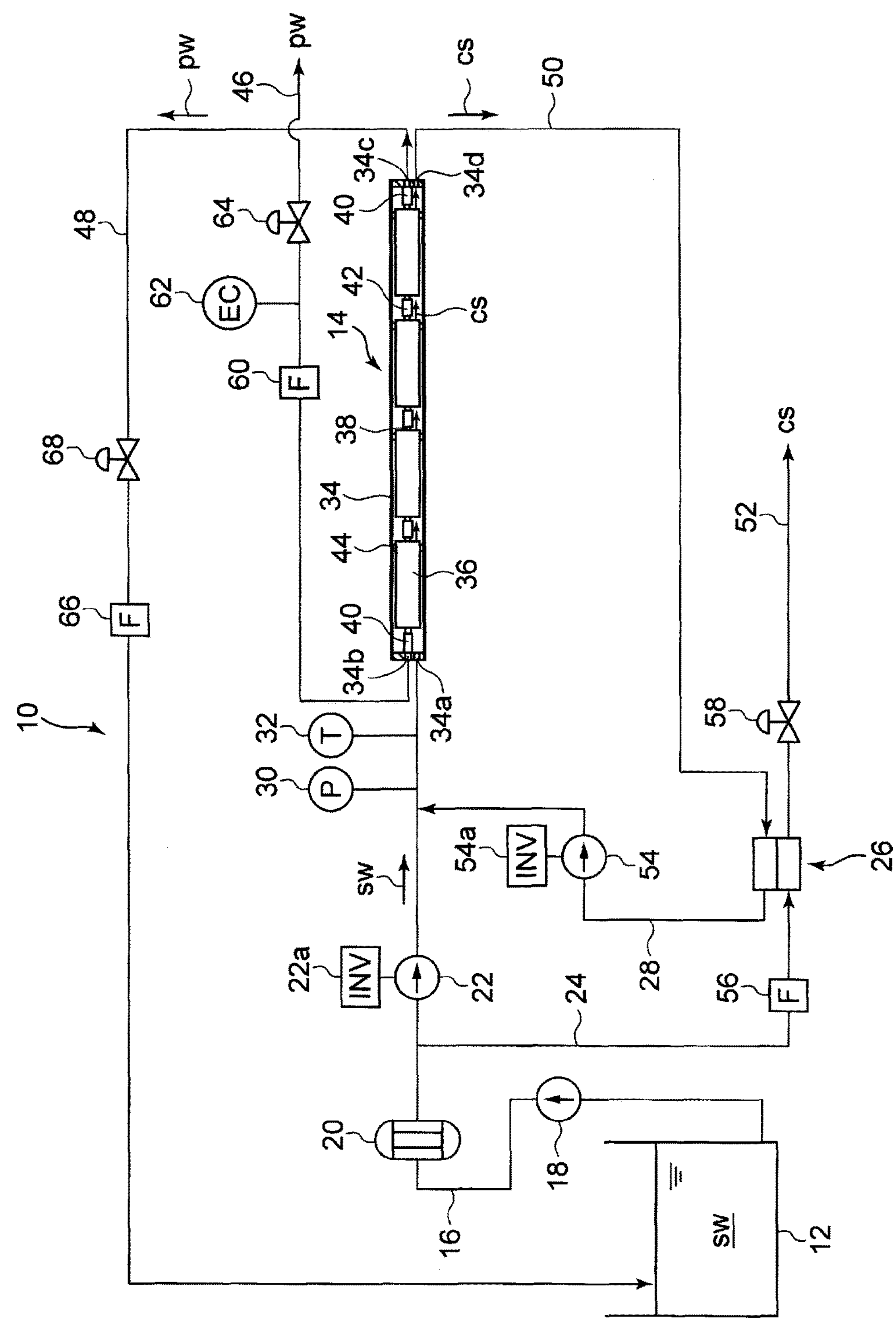
FIG. 1 is a flow diagram of a reverse osmosis membrane apparatus according to an embodiment of the present embodiment.

An embodiment of the present invention will be described with reference to FIG. 1 to FIG. 4. FIG. 1 is a flow diagram of a reverse osmosis membrane apparatus 10 applied to a seawater desalination plant. In FIG. 1, in a to-be-treated water tank 12, stored is clarified seawater sw obtained by subjecting raw seawater to pretreatment of sterilization and removal of relatively large foreign substances such as dusts and microbes. To the to-be-treated water tank 12, a clarified seawater supply passage 16 for supplying clarified seawater sw to a reverse osmosis membrane module 14, is connected. The clarified seawater sw stored in the to-be-treated water tank 12 is flown into the clarified seawater supply passage 16 by a water supply pump 18 provided in the clarified seawater supply passage 16.

Impurities in the clarified seawater sw flown into the clarified water supply passage 16 are removed by a safety filter device 20. On a downstream side of the safety filter device 20, a high-pressure pump 22 is provided. The high-pressure pump 22 having an inverter device **22*a* is a variable flow rate pump of which rotational speed is controllable, and the flow rate of the clarified seawater sw is controlled by the high-pressure pump 22. At an inlet of the high-pressure pump 22, a branched passage 24 is branched from the clarified seawater supply passage 16. In the branched passage 24, a power recovery device 26 is provided. The power recovery device 26 is a pressure-exchange-type power recovery device to increase a pressure of the clarified seawater sw flown from the branched passage 24 and to send it to a booster pump 54, utilizing a pressure of concentrated seawater cs flown from a concentrated seawater discharging passage 50 which will be described later. The power recovery device 26** has, for example, a known structure (for example, see JP 2011-56439 A).

The branched passage 24 is connected to the inlet of the power recovery device 26, and a branched passage 28 is connected to the outlet of the power recovery device 26. The other end of the branched passage 28 is connected to the clarified seawater supply passage 16 on the upstream side of the reverse osmosis membrane module 14. On the clarified seawater supply passage 16, a pressure sensor 30 and a temperature sensor 32 are provided between the joint portion of the branched passage 28 and reverse osmosis membrane module 14.

Figure 6:
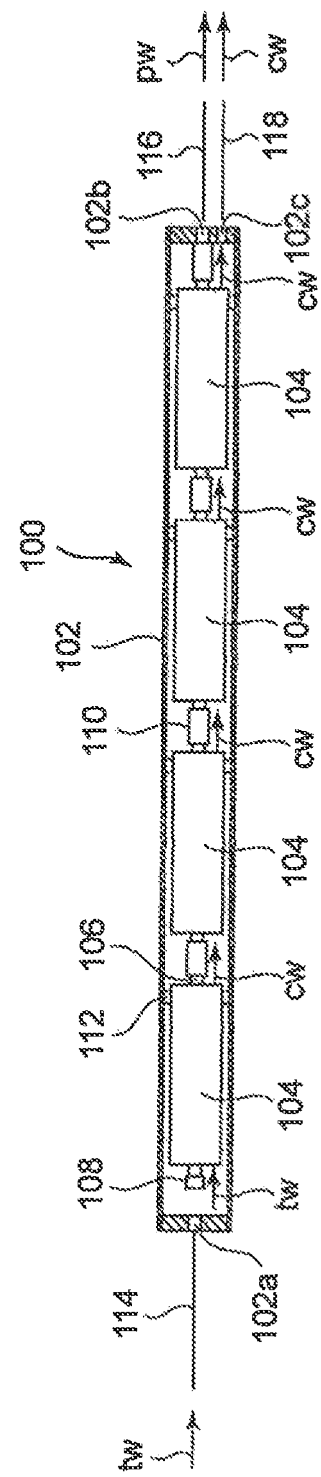
FIG. 6 is a cross-sectional diagram of a conventional reverse osmosis membrane module.

The reverse osmosis membrane module 14 has a high pressure vessel 34 and a plurality of reverse osmosis membrane elements 36 arranged in series inside the high pressure vessel 34. At an inlet end of the high pressure vessel 34, an inlet opening 34*a* to which the clarified seawater supply passage 16 is connected, is formed, and from the inlet opening 34*a*, the clarified seawater sw is flown into the high pressure vessel 34. The reverse osmosis membrane module 14 has a cylindrical shape and has the same configuration as the spiral-type reverse osmosis membrane module 100 as shown in FIG. 6. Along the central axis of the reverse osmosis membrane module 14, provided is a center pipe 38 to which permeate water is collected.

The center pipe 38 of each of the reverse osmosis membrane elements 36 is connected with a connector 40, and permeate water from each of the reverse osmosis membrane elements 36 is joined together in the center pipes 38. On the other hand, in the intermediate portion is blocked by an end cap 42 so that permeate water from an earlier stage element of the reverse osmosis membrane elements 36 and permeate water from a later stage element of the reverse osmosis membrane elements 36 are not mixed together. The internal space of the high pressure vessel 34 is separated with a brine seal 44 provided on an outer peripheral surface of each of the reverse osmosis membrane elements 36.

The clarified water sw flown from the inlet opening 34*a* into the high pressure vessel 34 is separated into permeate water pw and concentrated seawater cs with a reverse osmosis membrane provided in the first stage element of the reverse osmosis membrane elements 14. An inlet opening 34*b* is formed at an inlet end of the high pressure vessel 34, and a permeate water sending passage 46 is connected to the inlet opening 34*b*. The permeate water pw from the earlier stage element of the reverse osmosis membrane elements 36 is joined to the center pipe 38, and is flown out to the permeate water sending passage 46 on the earlier stage side via the connector 40 and the inlet opening 34*b*. The permeate water pw flown out to the permeate water sending passage 46 on the earlier stage side is sent to a downstream subsequent process.

At the outlet end of the high pressure vessel, an outlet openings 34*c* and 34*d* are formed. A permeate water circulation passage 48 is connected to the outlet opening 34*c*, and a concentrated seawater discharging passage 50 is connected to the outlet opening 34*d*. The permeate water separated with the reverse osmosis membrane provided in the later stage element of the reverse osmosis membrane elements 36 is joined to the center pipe 38, and is flown out to the permeate water circulation passage 48 on the later stage side via the connector 40 and the outlet opening 34*c*.

The concentrated seawater cs separated from the permeate water pw by the first stage element of the reverse osmosis membrane elements 36 is flown out from the outlet end of the first stage element of the reverse osmosis membrane elements 36, and flown into the second stage element of the reverse osmosis membrane elements 36 to be separated into permeate water pw and concentrated seawater cs. Concentrated seawater cs is thereby separated into permeate water pw and concentrated seawater cs by the reverse osmosis membrane elements 36 sequentially to be concentrated gradually. The concentrated seawater cs flown from the last stage element of the reverse osmosis membrane elements 36 is discharged from the outlet opening 34*d* to the concentrated seawater discharging passage 50. The concentrated seawater discharging passage 50 is connected to the power recovery device 26.

The high-pressure concentrated seawater cs flown out to the concentrated seawater discharging passage 50 is flown into the power recovery device 26 to increase the pressure of the clarified seawater sw entered from the branched passage 24 and send out the seawater sw to the branched passage 28. As the pressure of the clarified seawater sw at the inlet of the high pressure vessel 34 is thereby increased, a part of the power for the high-pressure pump 22 can be provided by the power recovery device 26.

To the outlet of the power recovery device 26, a concentrated seawater discharging passage 52 is provided, and the concentrated seawater cs having a low pressure and flown out from the power recovery device 26 is discharged from the concentrated seawater discharging passage 52. In the branched passage 28, a booster pump 54 is provided, and the pressure of the clarified seawater sw can be increased by the booster pump 54 to increase the flow rate of the clarified seawater. The booster pump 54 has provided an inverter device 54*a* capable of controlling the rotational speed of the pump. A flowmeter 56 is provided in the branched passage 24, and a flow regulating valve 58 is provided in the concentrated seawater discharging passage 52.

In the permeate water sending passage 46, a flowmeter 60, a salinity meter 62 to detect an electric conductivity of the permeate water pw and to obtain the salinity from the detected value, and a flow regulating valve 64 are provided. In the permeate water circulation passage 48, a flowmeter 66 and a flow regulating valve 68 are provided.

Figure 2:
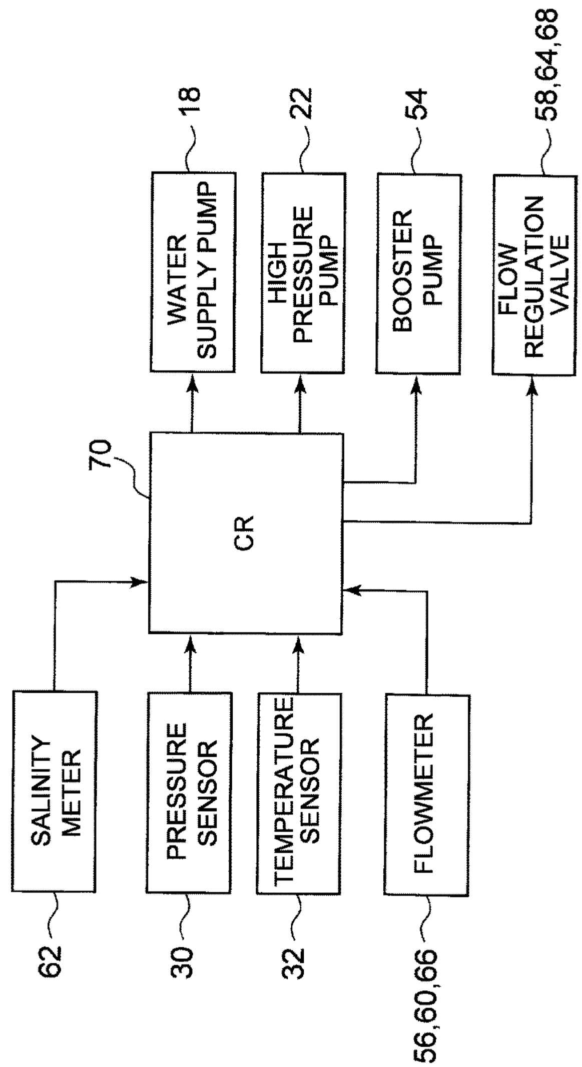
FIG. 2 is a block diagram illustrating a control system according to an embodiment.

FIG. 2 is a block diagram illustrating a control system for the reverse osmosis membrane apparatus 10. In FIG. 2, detected values of the pressure sensor 30, the temperature sensor 32, flowmeters 56, 60 and 66, and the salinity meter 62 are input to the controller 70. On the basis of the detected values, the controller 70 controls the behavior of the water supply pump 18, the high pressure pump 22 and the booster pump 54, and controls the opening degree of the flow regulating valves 58, 64 and 68.

According to the embodiment, the permeate water pw having a better water quality from the earlier stage element of the reverse osmosis membrane elements 36 is sent to the downstream subsequent process, and the permeate water pw having a worse water quality from the later stage element of the reverse osmosis membrane elements 36 is returned to the to-be-treated water tank 12. By returning the permeate water pw from the later stage element of the reverse osmosis membrane elements 36 to the to-be-treated water tank 12 to decrease the salinity of the clarified seawater sw to be supplied to the high pressure vessel 34, it is possible to decrease the salinity of the permeate water pw.

In such a configuration, by controlling the rotational speed of the high pressure pump 22 to control the pressure of the clarified seawater sw at the inlet of the high pressure vessel 34, the flow rate of the permeate water from the earlier stage element of the reverse osmosis membrane elements 36 is controlled so as to be constant. In addition, while the detected value of the salinity meter 62 is monitored, the flow rate of the permeate water from the later stage element of the reverse osmosis membrane elements 36 flowing in the permeate water circulation passage 48 is controlled so that the salinity becomes the reference value.

Figure 3:
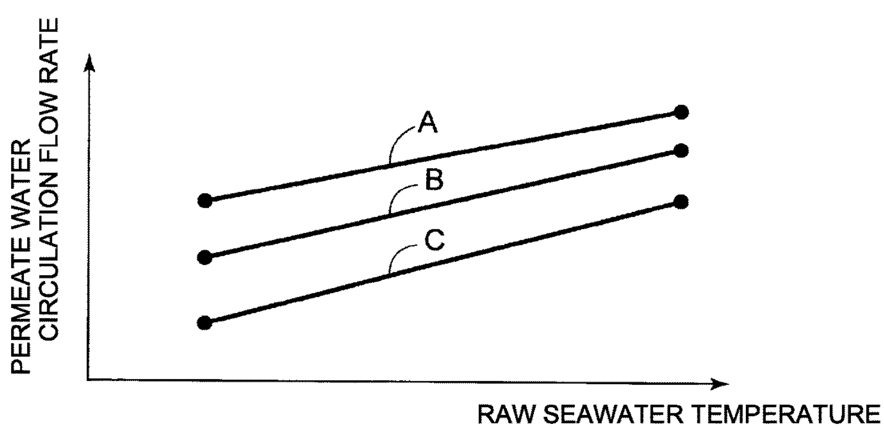
FIG. 3 is a chart showing a relationship among a seawater temperature, deterioration degree of a reverse osmosis membrane and a circulation flow rate of permeate water.

FIG. 3 is a chart where the horizontal axis represents the temperature of the clarified seawater sw, and the vertical axis represents the circulation flow rate of the permeate water from the later stage element of the reverse osmosis membrane elements 36. In FIG. 3, each of the three lines represents the circulation flow rate of the permeate water required to satisfy the required value of the water quality of the permeate water: the line A is for a case where the deterioration degree of a reverse osmosis membrane of the reverse osmosis membrane elements 36 is large, the line B is for a case where the deterioration degree of the reverse osmosis membrane is small, and the line C is for a case where the reverse osmosis membrane is not deteriorated. In a case where temperature of the clarified seawater is increased, as the water quality of the permeate water pw is declined, the circulation flow rate of the permeate water is increased so that the water quality of the permeate water pw satisfies the required value. In a case where the reverse osmosis membrane is deteriorated, as the water quality of the permeate water pw is declined, the circulation flow rate of the permeate water is increased so that the water quality of the permeate water pw satisfies the required value.

Figure 4:
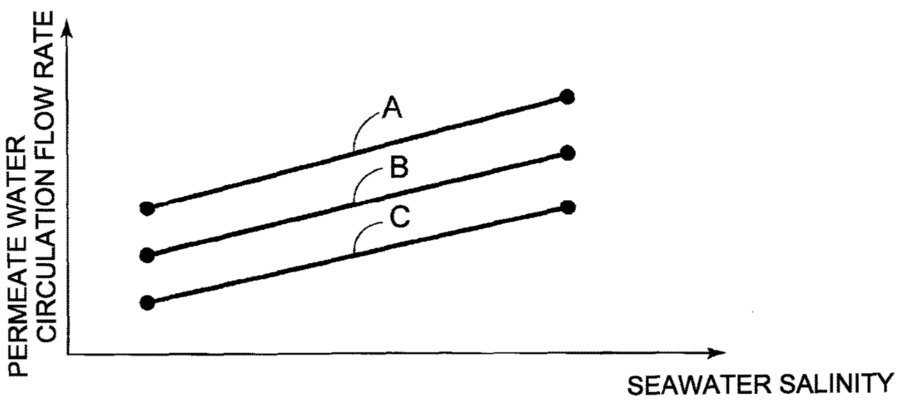
FIG. 4 is a chart showing a relationship among a seawater salinity, deterioration degree of a reverse osmosis membrane and a circulation flow rate of permeate water.

FIG. 4 is a chart where the horizontal axis represents the salinity of the clarified seawater sw, and the vertical axis represents the circulation flow rate of the permeate water from the later stage element of the reverse osmosis membrane elements 36. In a case where the salinity of the clarified seawater sw is increased, the circulation flow rate of the permeate water is increased so that the water quality of the permeate water pw satisfies the required value. In a case where the reverse osmosis membrane is deteriorated, as the water quality of the permeate water pw is declined, the circulation flow rate of the permeate water is increased so that the water quality of the permeate water pw satisfies the required value.

According to the embodiment, during the operation of the reverse osmosis membrane apparatus 10A, by controlling the flow rate of the clarified seawater sw supplied to the reverse osmosis membrane module 14 and the circulation flow rate of the permeate water returned to the to-be-treated water tank 12 depending upon the temperature or salinity of the clarified seawater sw or the deterioration degree of the reverse osmosis membrane module 14, it is possible to satisfy the required value of the permeate water pw and to supply the permeate water pw stably. Further, as the required value of the permeate water pw is less likely to be excessively satisfied, energy-saving operation becomes possible. In addition, the control as described above can be automated by using the controller 70.

Since the permeate water pw from the later stage element of the reverse osmosis membrane elements 14 is returned to the to-be-treated water tank 12, there is no need to consider the pressure balance between the flow passage for returning the permeate water pw and the flow passage for receiving the permeate water pw. Thus, a device to adjust pressure therebetween becomes unnecessary, and it is thereby possible to reduce cost and to permit change in flow rate of the permeate water to be returned without limitation.

By increasing the pressure of the clarified seawater sw flown into the branched passage 24 by the power recovery device 26, it is possible to increase the pressure of the clarified seawater sw flown into the inlet opening 34*a* of the high pressure vessel 34. It is thereby possible to reduce the power for the high-pressure pump 22, and energy-saving operation becomes possible. In addition to the above control, by controlling the rotational speed of the booster pump 54 to control the flow rate of the clarified seawater sw flown into the branched passage 24, it is possible to control the water quality and the supply amount of the permeate water pw more accurately.

According to the embodiment, the total amount of the permeate water pw from the later stage element of the reverse osmosis membrane elements 14 is returned to the to-be-treated water tank 12. However, by using a branched passage branched from the permeate water circulation passage 48 and connected to the permeate water sending passage 46, only a part of the permeate water pw may be circulated to the to-be-treated water tank 12. It is thereby possible to facilitate the control of the circulation flow rate of the permeate water.

Figure 5:
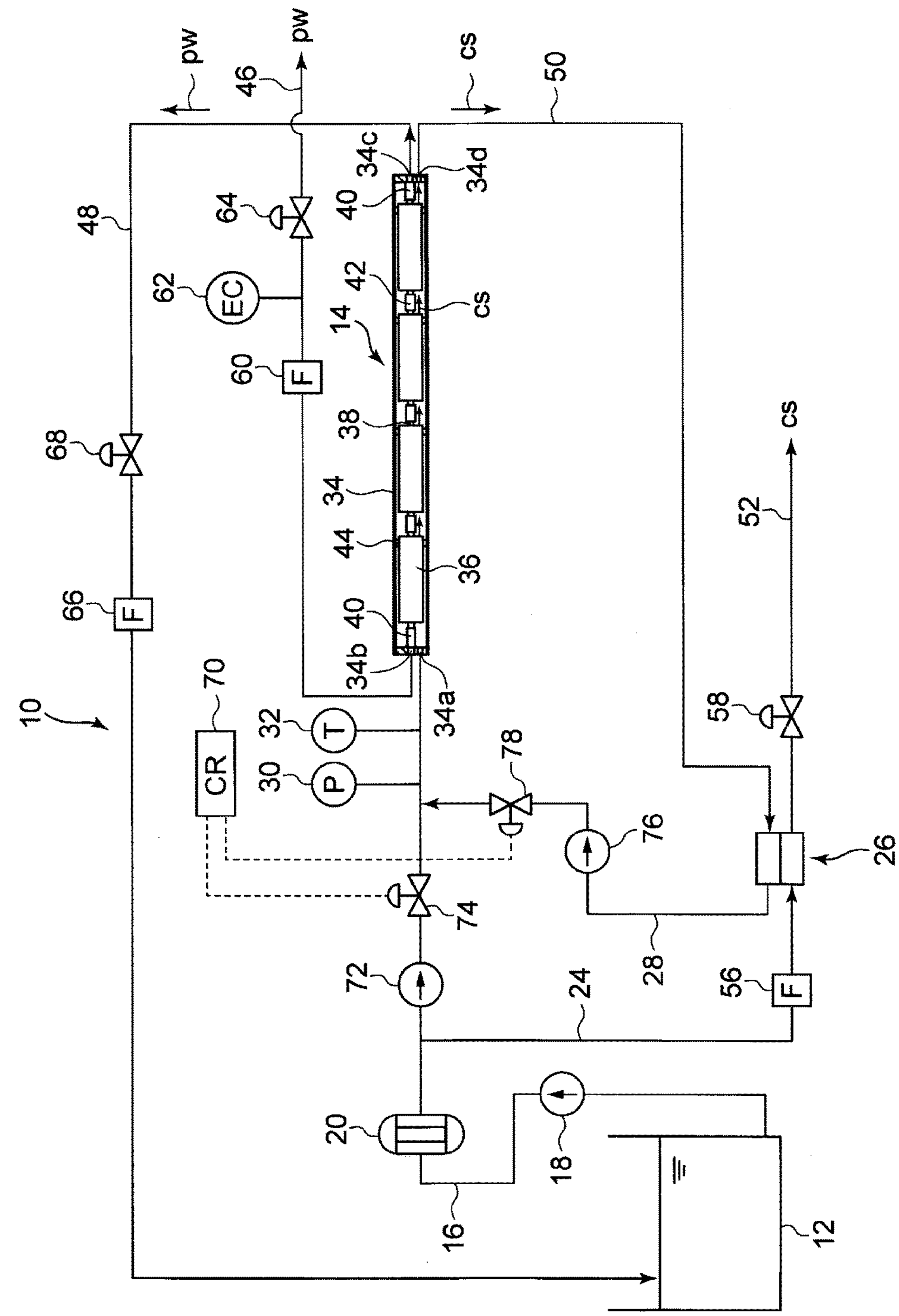
FIG. 5 is a flow diagram illustrating a modified example of an embodiment.

Now, a modified example of the embodiment will be described with reference to FIG. 5. In this modified example, as the means for controlling the flow rate of the clarified seawater sw flown into the high pressure vessel 34, a constant flow rate high-pressure pump 72, which is not of a variable flow rate type, is provided in the clarified seawater supply passage 16, and a flow regulating valve 74 is provided on the outlet side of the high-pressure pump 72. In addition, a booster pump 76, which is not of a variable flow rate type, is provided in the branched passage 28, and a flow regulating valve 78 is provided on the outlet side of the booster pump 76. The opening degrees of the flow regulating valves 74 and 78 are controlled by the controller 70. Except for what is specified in the above description, this example has the same configuration as the above embodiment.

In this modified example, operation is carried out in the same manner as in the above embodiment. That is, while the detected values of by the pressure sensor 30, the temperature sensor 32, the salinity meter 62 and the flowmeters 56, 60 and 66 are monitored by the controller 70, the flow rate of the clarified seawater sw flowing in the clarified seawater supply passage 16 and the flow rate of the permeate water pw flowing in the permeate water circulation passage 48 are controlled. According to this modified example, there is an advantage that it is possible to simplify the flow rate control of the clarified seawater supply passage 16 and the branched passage 28 and to reduce cost thereof.

In the above embodiment and the above modified example, the controller 70 is provided and control of the high-pressure pump 22 and the booster pump 54, and regulation of the flow regulating valves 58, 64, 68, 74 and 78 are automated. However, alternatively, such control may be carried out manually by an operator without providing a controller 70.

In the above embodiment and the above modified example, a spiral-type reverse osmosis membrane element 14 is used as the reverse osmosis membrane module. However, instead of the spiral-type reverse osmosis membrane element 14, a flat membrane-type reverse osmosis membrane element may be employed. The present invention may also be applied to, for example, pure water production apparatuses.

INDUSTRIAL APPLICABILITY

According to the present invention, a reverse osmosis membrane apparatus which enables energy-saving operation and stable supply of permeate water while satisfying a required value of the permeate water during operation, is provided.

REFERENCE SIGNS LIST

10 Reverse osmosis membrane apparatus
12 To-be-treated water tank
14, 100 Reverse osmosis membrane module
16 Clarified seawater supply passage
18 Water supply pump
20 Safety filter device
22, 72 High pressure pump
22*a* Inverter device
24, 28 Branched passage
26 Power recovery device
30 Pressure sensor

32 Temperature sensor
34, 102 High pressure vessel
34*a*, 34*b*, 102*a* Inlet opening
34*c*, 34*d*, 102*b*, 102*c* Outlet opening
36, 104 Reverse osmosis membrane element
38, 106 Center pipe
40, 110 Connector
42, 108 End cap
44, 112 Brine seal
46 Permeate water sending passage on earlier stage side
48 Permeate water circulation passage on later stage side
50, 52 Concentrated seawater discharging passage
54, 76 Booster pump
54*a* Inverter device
56, 60, 66 Flowmeter
58, 64, 68, 74, 78 Flow regulating valve
62 Salinity meter
70 Controller
114 To-be-treated water supply passage
116 Permeate water discharging passage
118 Concentrated water discharging passage
Cs Concentrated seawater
Cw Concentrated water
Sw Clarified seawater
Pw Permeate water
Tw To-be-treated water

The invention claimed is:

1. A method of operating a reverse osmosis membrane apparatus including a reverse osmosis membrane module having a plurality of reverse osmosis membrane elements arranged in series inside a high pressure vessel, the method comprising:

a step of supplying to-be-treated water to the reverse osmosis membrane module from a to-be-treated water tank in which the to-be-treated water is stored;

a step of treating the to-be-treated water by the plurality of reverse osmosis membrane elements sequentially to obtain: upstream permeate water separated by at least one upstream element including a first stage element among the plurality of reverse osmosis membrane elements; and downstream permeate water separated by at least one downstream element disposed downstream of the at least one upstream element;

a step of circulating at least a part of the downstream permeate water to the to-be-treated water tank;

a step of measuring a salinity of the upstream permeate water obtained by the at least one upstream element; and a step of controlling a circulation flow rate of the downstream permeate water based on measurement results of the salinity of the upstream permeate water.

2. The method of operating a reverse osmosis membrane apparatus according to claim 1, further comprising:

a step of measuring a flow rate of the upstream permeate water obtained by the at least one upstream element; and a step of controlling a flow rate of the to-be-treated water supplied to the reverse osmosis membrane module to maintain the flow rate of the upstream permeate water at a target value, based on measurement results of the flow rate of the upstream permeate water.

3. The method of operating a reverse osmosis membrane apparatus according to claim 2, further comprising:

a step of directing a part of the to-be-treated water supplied to a power recovery device disposed on a branched passage branching from a to-be-treated water supply passage, and then directing the part of the to-be-treated water to flow into the to-be-treated water supply passage after pressurizing the part of the to-be-treated water by the power recovery device in the branched passage, wherein, in the step of controlling the flow rate of the to-be-treated water, the flow rate of the upstream permeate water is maintained at the target value by controlling both of a flow rate of the to-be-treated water in the to-be-treated water supply passage and a flow rate of the part of the to-be-treated water in the branched passage.

4. The method of operating a reverse osmosis membrane apparatus according to claim 2, wherein when a temperature of the to-be-treated water is increased, the circulation flow rate of the downstream permeate water is increased, and the flow rate of the to-be-treated water supplied to the reverse osmosis membrane module is increased; and when the temperature of the to-be-treated water is decreased, the circulation flow rate of the downstream permeate water is decreased, and the flow rate of the to-be-treated water supplied to the reverse osmosis membrane module is decreased.

5. The method of operating a reverse osmosis membrane apparatus according to claim 2, wherein when a salinity of the to-be-treated water (sw) is increased, the circulation flow rate of the downstream permeate water is increased, and the flow rate of the to-be-treated water supplied to the reverse osmosis membrane module is increased; and when the salinity of the to-be-treated water is decreased, the circulation flow rate of the downstream permeate water is decreased, and the flow rate of the to-be-treated water supplied to the reverse osmosis membrane module is decreased.

6. The method of operating a reverse osmosis membrane apparatus according to claim 2, wherein when the reverse osmosis membrane of the reverse osmosis membrane elements is deteriorated, the circulation flow rate of the downstream permeate water is increased, and the flow rate of the to-be-treated water supplied to the reverse osmosis membrane module is increased.

7. The method of operating a reverse osmosis membrane apparatus according to claim 2, wherein the reverse osmosis membrane apparatus includes a variable flow rate pump having an inverter device capable of controlling a rotational speed of the pump, the pump being provided in a to-be-treatment water supply passage through which the to-be-treated water is supplied to the reverse osmosis membrane module from the to-be-treated water tank, and wherein in the step of controlling flow rate of the to-be-treated water, the rotational speed of the variable flow rate high-pressure pump is controlled to control the flow rate of the to-be-treated water flowing into the reverse osmosis membrane module.

8. The method of operating a reverse osmosis membrane apparatus according to claim 2, wherein the reverse osmosis membrane apparatus includes a flow regulating valve provided in a to-be-treated water supply passage through which the to-be-treated water is supplied to the reverse osmosis membrane module from the to-be-treated water tank, and wherein in the permeate water flow rate control step, the opening degree is controlled to control the flow rate of the to-be-treated water flowing into the reverse osmosis membrane module.

* * * * *